(12) United States Patent
Healy et al.

(10) Patent No.: US 9,664,058 B2
(45) Date of Patent: May 30, 2017

(54) FLOWPATH BOUNDARY AND ROTOR ASSEMBLIES IN GAS TURBINES

(71) Applicant: General Electric Company, Schenectady, NY (US)

(72) Inventors: Michael James Healy, Greenville, SC (US); Patrick Daniel Noble, Greeville, SC (US); Jeremy Peter Latimer, Greenville, SC (US); Brendon James Leary, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 14/587,714

(22) Filed: Dec. 31, 2014

(65) Prior Publication Data

US 2016/0186591 A1    Jun. 30, 2016

(51) Int. Cl.
*F01D 5/06* (2006.01)
*F01D 5/30* (2006.01)
*F01D 11/00* (2006.01)
*F04D 29/32* (2006.01)
*F04D 29/16* (2006.01)

(52) U.S. Cl.
CPC .......... *F01D 11/008* (2013.01); *F01D 5/3007* (2013.01); *F04D 29/164* (2013.01); *F04D 29/321* (2013.01); *F04D 29/322* (2013.01); *F04D 29/329* (2013.01); *Y02T 50/671* (2013.01); *Y02T 50/673* (2013.01)

(58) Field of Classification Search
CPC .... F01D 5/3007; F01D 11/008; F04D 29/164; F04D 29/321; F04D 29/322; F04D 29/329; Y02T 50/671; Y02T 50/673
See application file for complete search history.

(56) References Cited

U.S. PATENT DOCUMENTS

| | | | | | |
|---|---|---|---|---|---|
| 2,656,147 | A | * | 10/1953 | Brownhill | F01D 5/084 416/193 A |
| 3,094,309 | A | * | 6/1963 | Hull, Jr. | F01D 5/06 415/173.7 |
| 3,894,324 | A | * | 7/1975 | Holzapfel | F01D 5/06 29/889.2 |
| 4,432,697 | A | * | 2/1984 | Miura | F01D 5/06 415/199.5 |
| 4,659,285 | A | * | 4/1987 | Kalogeros | F01D 5/3015 416/220 R |

(Continued)

*Primary Examiner* — Igor Kershteyn
(74) *Attorney, Agent, or Firm* — Mark E. Henderson; Ernest G. Cusick; Frank A. Landgraff

(57) ABSTRACT

A gas turbine that having a flowpath having a rotor assembly that includes: a first rotor wheel supporting a first rotor blade having a platform that defines a first axial section of an inner boundary of the flowpath; a second rotor wheel supporting a second rotor blade having a platform that defines a second axial section of the inner boundary of the flowpath; and an annulus filler that includes an outboard surface that defines at least part of a third axial section of the inner boundary of the flowpath occurring between the first axial section and the second axial section of the inner boundary of the flowpath. The first rotor wheel may include an axial connector for axially engaging a mating surface formed on a radially innermost face of the first rotor blade and a mating surface formed on a radially innermost face of the annulus filler.

28 Claims, 11 Drawing Sheets

(56) References Cited

U.S. PATENT DOCUMENTS

| | | | |
|---|---|---|---|
| 4,668,167 A * | 5/1987 | Le Maoût | F01D 5/3015 416/193 A |
| 4,719,747 A * | 1/1988 | Willkop | F01D 5/066 415/115 |
| 5,601,404 A * | 2/1997 | Collins | F01D 5/02 415/173.7 |
| 5,713,721 A | 2/1998 | Glynn et al. | |
| 7,186,079 B2 * | 3/2007 | Suciu | F01D 5/066 415/199.5 |
| 7,726,937 B2 * | 6/2010 | Baumann | F01D 5/06 415/191 |
| 8,061,995 B2 | 11/2011 | Prince et al. | |
| 8,267,664 B2 | 9/2012 | Tipton et al. | |
| 8,287,239 B2 | 10/2012 | Dimelow | |
| 8,297,931 B2 | 10/2012 | Read et al. | |
| 2012/0301308 A1 | 11/2012 | Thermos et al. | |
| 2013/0136605 A1 | 5/2013 | Bart et al. | |
| 2013/0266447 A1 | 10/2013 | Evans et al. | |

* cited by examiner

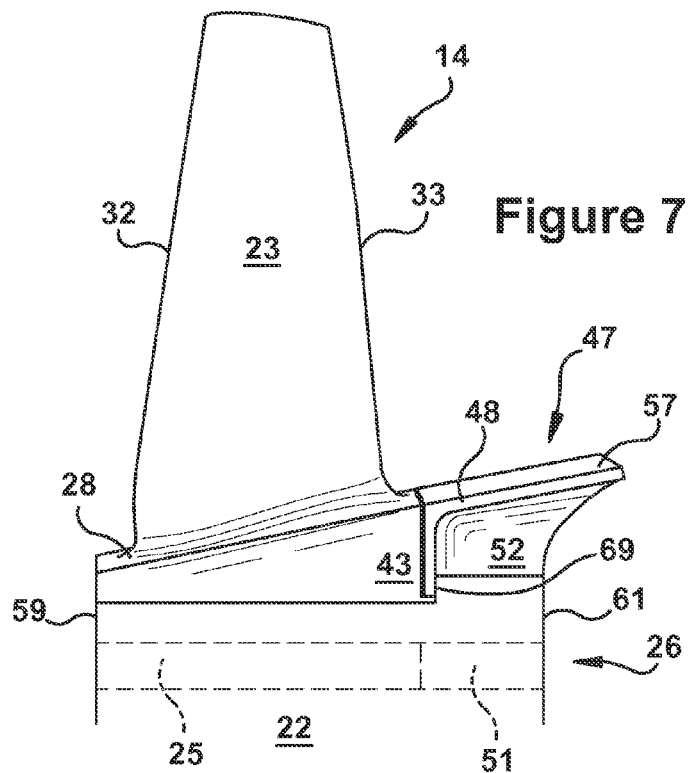
Figure 7
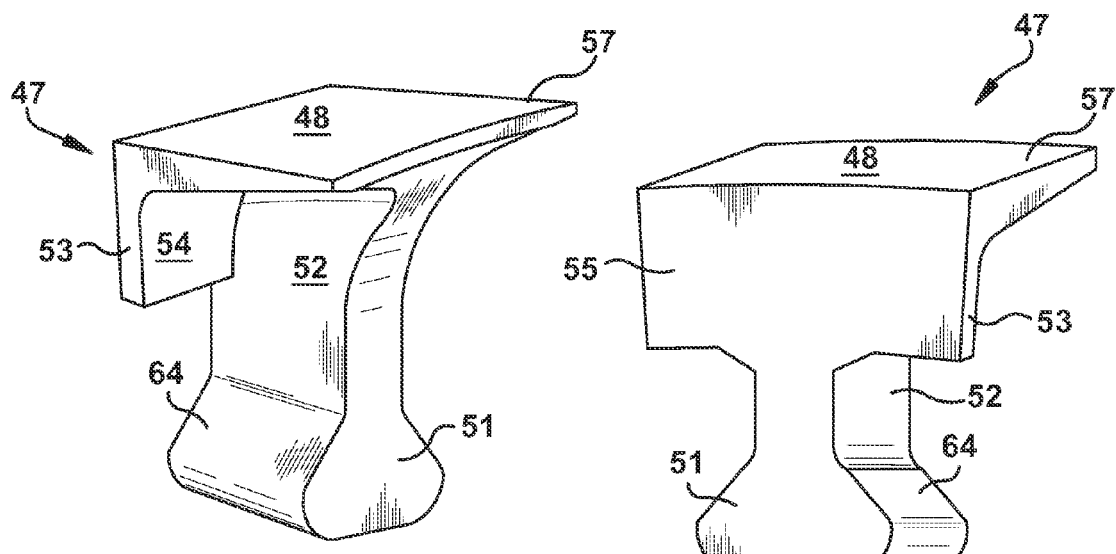
Figure 8
Figure 9

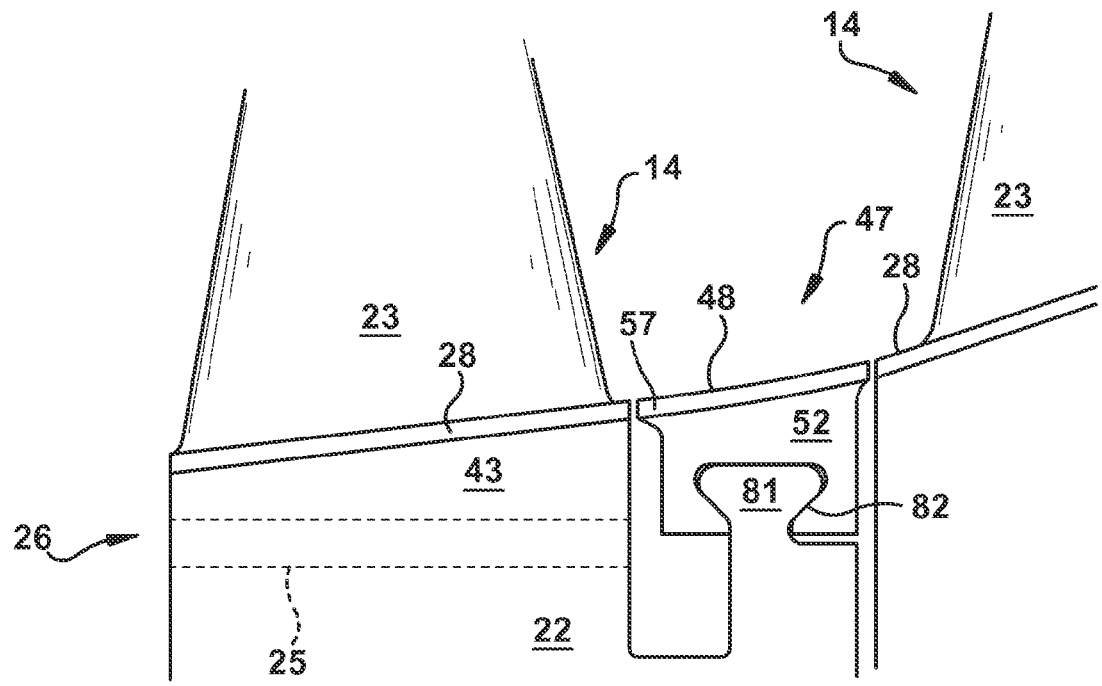
Figure 18
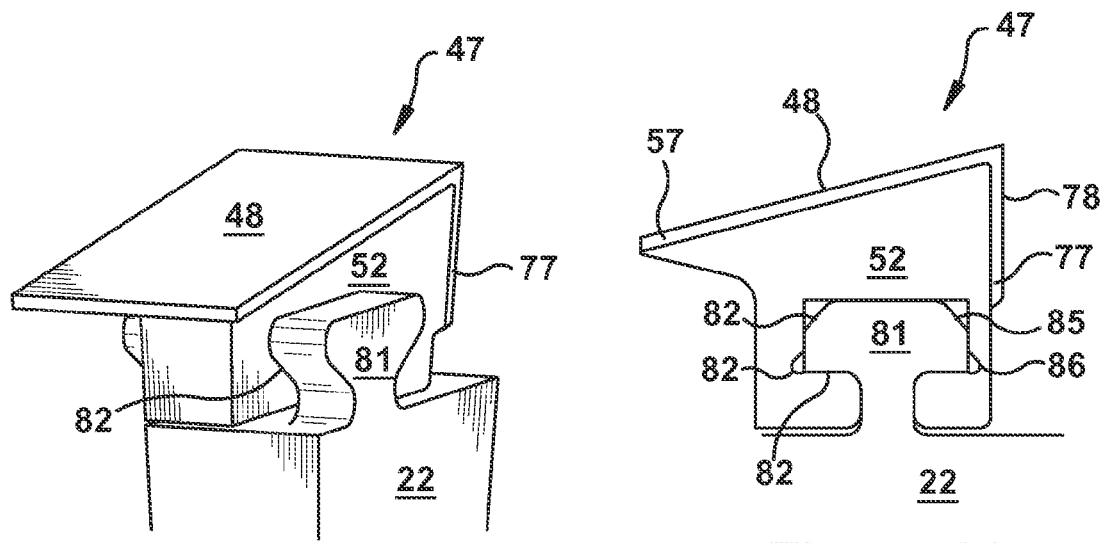
Figure 19
Figure 20

FLOWPATH BOUNDARY AND ROTOR ASSEMBLIES IN GAS TURBINES

BACKGROUND OF THE INVENTION

The present invention relates generally to combustion gas turbine engines (or "gas turbines"), and, more specifically, but not be way of limitation, to flowpath boundary assemblies within gas turbines.

Gas turbines are widely utilized in fields such as power generation. A conventional gas turbine, for example, includes a compressor, a combustor, and a turbine. Gas turbines may further include a rotor with various rotor blades mounted to rotor wheels in the compressor and turbine sections thereof. Each rotor blade includes an airfoil over which pressurized air or fluid flows, and an inner sidewall or platform at the base of the airfoil that defines the radial boundary for the air or fluid flow therethrough. In certain turbine engine configurations, the blades are loaded into slots formed in the rotor wheel. The blades must be retained in the slots so as to prevent any radial or axial movement of the blades during operation of the turbine. Typically, dovetail mountings on the blades and complimentary dovetail slots in the wheel serve to prevent radial movement. A retention system may be utilized to ensure the rotary blades remain coupled to the rotor. However, to the extent that these retention systems include complex arrangements, production and maintenance costs may quickly escalate.

Further, the passages between adjacent blades require a smooth surface for forming the radially inner boundary of the annulus so to ensure the clean flow of air through the stage during operation. It is not preferable for the blades or the rotor wheel to accommodate this surface and usually a so called "annulus filler" is provided to bridge the annulus gap between adjacent rotor blades. It is known to provide such annulus fillers with features for removably attaching them to the rotor disc. Annulus fillers, thus, are usually manufactured from relatively lightweight materials and, in the event of damage, may be replaced independently of the blades. As a rotating component, a lighter weight filler will have lower internal forces during engine operation and also reduce forces transmitted to the rotor disc. Additionally, a smaller component mass is of benefit in reducing the overall weight of the engine and contributing to improved engine efficiency. However, an annulus filler must still be a robust component to meet operational demands and function properly under a variety of operating extremes.

A number of methods exist for mounting the annulus filler. However, as will be appreciated, there are many competing and variable design considerations that make optimization a constant objective. For example, the engagement feature must be able to withstand considerable wear and corrosion, including the extreme mechanical and thermal stresses caused by friction and heat cycling associated with the flowpath of the engine. Additionally, during engine operation the circumferential distance of the annulus gap may vary due to vibrations, twisting of blades, and relative movement between adjacent blades. In the extreme, the annulus filler may be subject to forces and relative movement between rotor blades, which can reduce the life of the rotor wheel and necessitate regular inspection during the lifetime of assembly. Furthermore, conventional manufacturing processes for rotor wheels limit the types of configurations for the connectors. As will be appreciated, requiring additional features or weight on the rotor wheel gives rise to design and manufacturing considerations to control stress in the component, and any features that add complexity may be cost prohibitive to manufacture.

Thus, an improved retention devices and assemblies for annulus filler and rotor blade assemblies would be desired in the art. For example, an axial retention device that prevents axial movement of the blades and/or annulus filler components with respect to the rotor wheels and other support structures would be advantageous. Further, a retention devices that provides for efficient and cost-effective replacement of the blades, annulus fillers, and/or other related components, and that reduces or eliminates the need to replace the rotor wheels and other support structures, would be desired.

BRIEF DESCRIPTION OF THE INVENTION

The present application thus describes a gas turbine that includes a flowpath having a rotor assembly that includes: a first rotor wheel supporting a first rotor blade, the first rotor blade including a platform that defines a first axial section of an inner boundary of the flowpath; a second rotor wheel supporting a second rotor blade, the second rotor blade including a platform that defines a second axial section of the inner boundary of the flowpath; and an annulus filler that includes an outboard surface that defines at least part of a third axial section of the inner boundary of the flowpath occurring between the first axial section and the second axial section of the inner boundary of the flowpath. The first rotor wheel may include an axial connector for axially engaging a mating surface formed on a radially innermost face of the first rotor blade and a mating surface formed on a radially innermost face of the annulus filler.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 7 is a perspective view of a rotor blade and annulus filler according to an exemplary embodiment of the present invention;

FIG. 8 is a perspective view of an annulus filler according to an exemplary embodiment of the present invention;

FIG. 9 is an alternative perspective view of the annulus filler of FIG. 8;

FIG. 18 is a side view of a rotor blade and annulus filler having an alternative attachment configuration according to an exemplary embodiment of the present invention;

FIG. 19 is a side view of an attachment configuration for an annulus filler according to an exemplary embodiment of the present mention; and FIG. 20 is a perspective view of an attachment configuration for an annulus filler according to an alternative embodiment of the present invention.

DETAILED DESCRIPTION OF THE INVENTION

Figure 1:
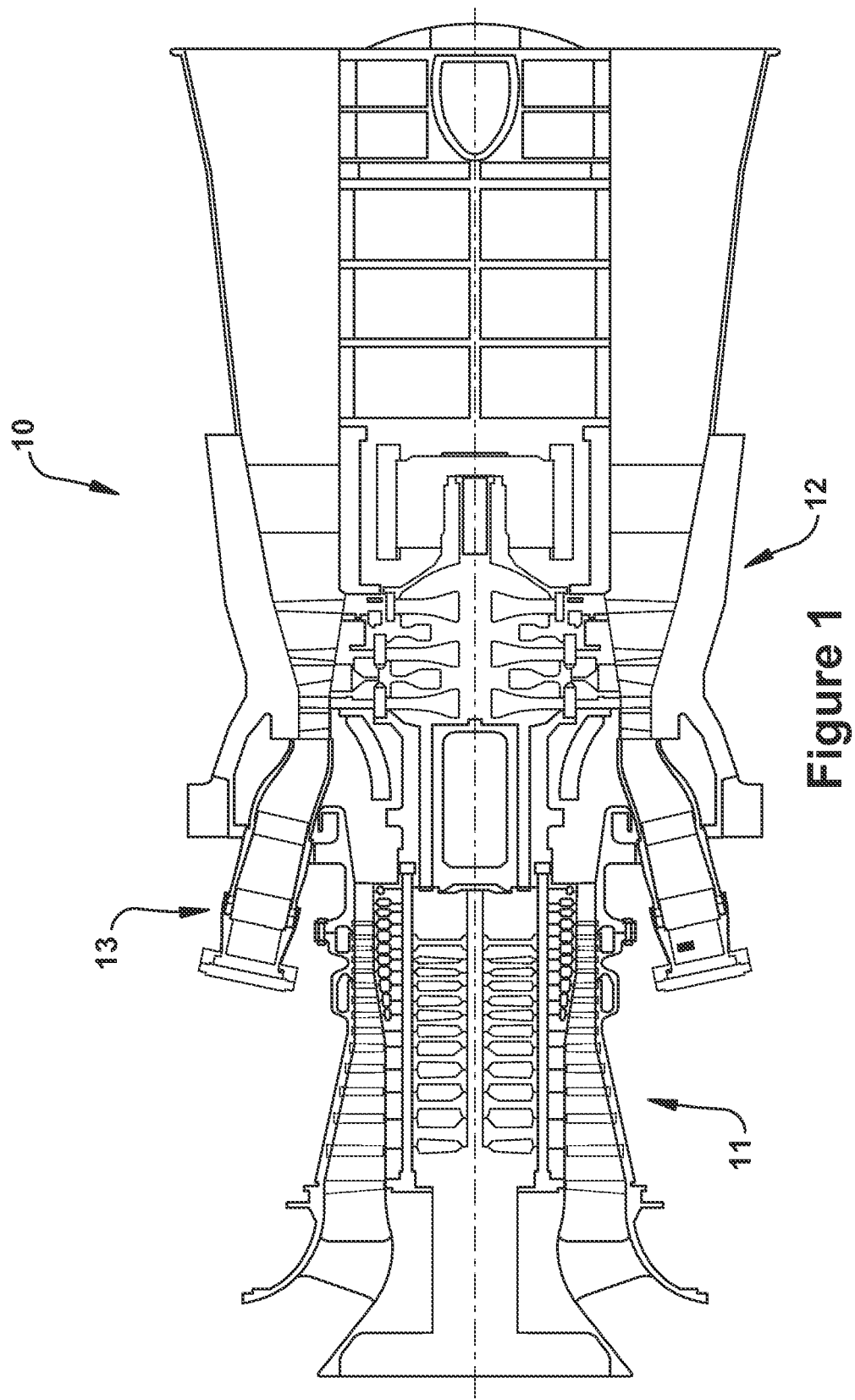
FIG. 1 is a schematic representation of an exemplary turbine engine in which blade assemblies according to embodiments of the present application may be used.

Aspects and advantages of the invention are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to a certain type of turbine engine, the technology of the present invention also may be applicable to other types of turbine engines as would the understood by a person of ordinary skill in the relevant technological arts.

Given the nature of turbine engine operation, several descriptive terms may be used throughout this application so to explain the functioning of the engine and/or the several sub-systems or components included therewithin, and it may prove beneficial to define these terms at the onset of this section. Accordingly, these terms and their definitions, unless stated otherwise, are as follows. The terms "forward" and "aft", without further specificity, refer to directions relative to the orientation of the gas turbine. That is, "forward" refers to the forward or compressor end of the engine, and "aft" refers to the aft or turbine end of the engine. It will be appreciated that each of these terms may be used to indicate movement or relative position within the engine. The terms "downstream" and "upstream" are used to indicate position within a specified conduit relative to the general direction of flow moving through it. (It will be appreciated that these terms reference a direction relative to an expected flow during normal operation, which should be plainly apparent to anyone of ordinary skill in the art.) The term "downstream" refers to the direction in which the fluid is flowing through the specified conduit, while "upstream" refers to the direction opposite that. Thus, for example, the primary flow of working fluid through a turbine engine, which beings as air moving through the compressor and then becomes combustion gases within the combustor and beyond, may be described as beginning at an upstream location toward an upstream or forward end of the compressor and terminating at a downstream location toward a downstream or aft end of the turbine. In regard to describing the direction of flow within a common type of combustor, as discussed in more detail below, it will be appreciated that compressor discharge air typically enters the combustor through impingement ports that are concentrated toward the aft end of the combustor (relative to the combustors longitudinal axis and the aforementioned compressor/turbine positioning defining forward/aft distinctions). Once in the combustor, the compressed air is guided by a flow annulus formed about an interior chamber toward the forward end of the combustor, where the air flow enters the interior chamber and, reversing it direction of flow, travels toward the aft end of the combustor. In yet another context, coolant flows through cooling passages may be treated in the same manner.

Additionally, given the configuration of compressor and turbine about a central common axis, as well as the cylindrical configuration common to many combustor types, terms describing position relative to an axis may be used herein. In this regard, it will be appreciated that the term "radial" refers to movement or position perpendicular to an axis. Related to this, it may be required to describe relative distance from the central axis. In such cases, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis. Finally, the term "circumferential" refers to movement or position around an axis. As mentioned, while these terms may be applied in relation to the common central axis that extends through the compressor and turbine sections of the engine, these terms also may be used in relation to other components or subsystems of the engine. For example, in the case of a cylindrically shaped combustor, which is common to many gas turbine machines, the axis which gives these terms relative meaning is the longitudinal central axis that extends through the center of the cross-sectional shape, which is initially cylindrical, but transitions to a more annular profile as it nears the turbine. However, unless otherwise specified, the use of these terms should be understood as being relative to the center axis of the gas turbine and the forward and aft directions that correspond, respectively, to the compressor and turbine ends of the machine. It should further be appreciated that, when such terms are used to describe particular components, the assumption is that the components are configured in an assembled condition within the gas turbine.

FIG. 1 is a schematic representation of a gas turbine 10. In general, gas turbines operate by extracting energy from a pressurized flow of hot gas produced by the combustion of a fuel in a stream of compressed air. As illustrated in FIG. 1, a gas turbine 10 may be configured with an axial compressor 11 that is mechanically coupled by a common shaft or rotor to a downstream turbine section (or "turbine") 12, and a combustor 13 positioned between the compressor 11 and the turbine 12. While FIG. 1 shows an industrial power generation application of a gas turbine, it should be understood that the invention described herein may be used in all types of combustion turbine engines, including, for example, those used in aircraft, watercraft, and locomotive systems. In addition, although the flowpath assembly described herein is described in the context of a combustion turbines, it also may be utilized in other turbomachine systems, such as, for example, steam turbines, hydro turbines, or standalone compressors.

Figure 2:
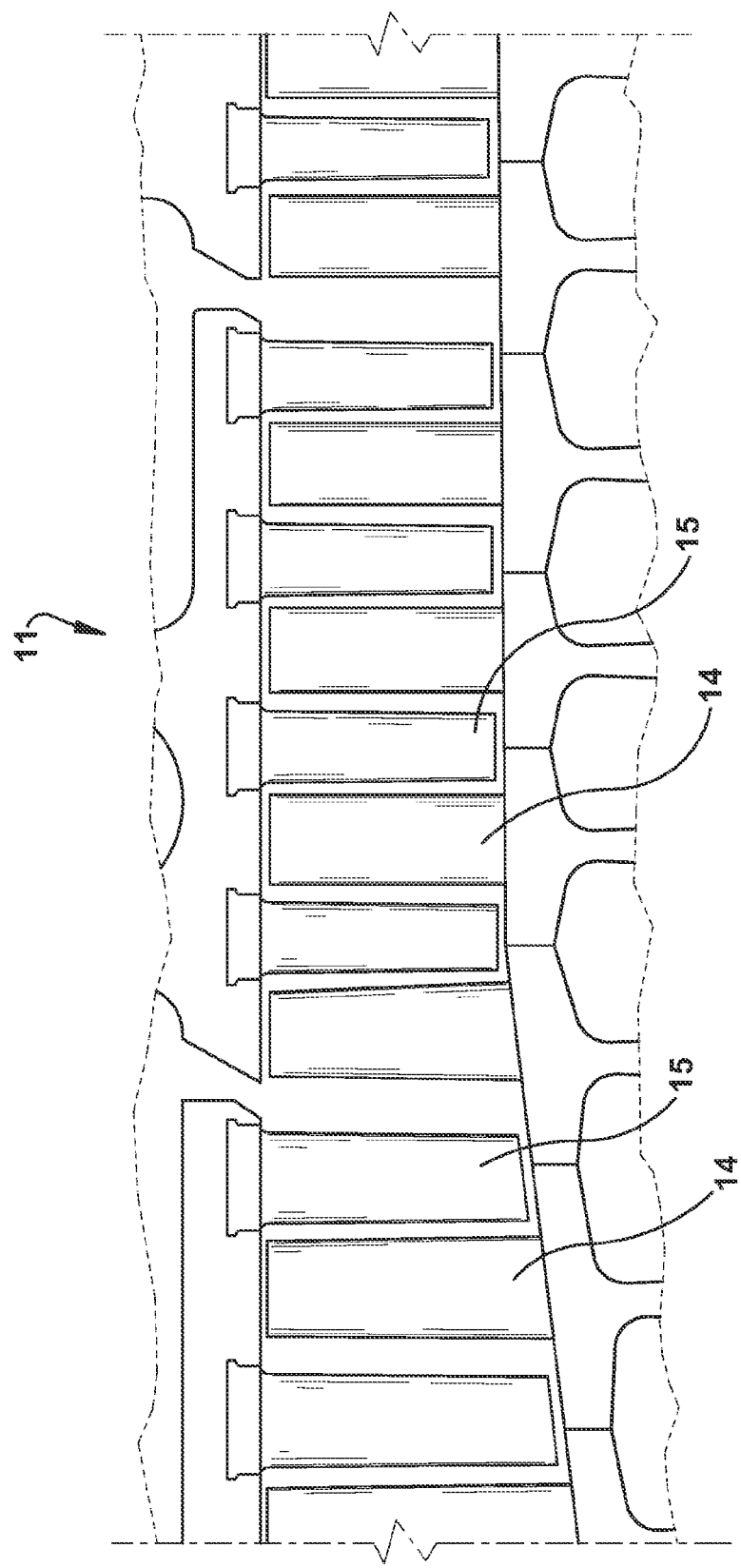
FIG. 2 is a sectional view of the compressor section of the combustion turbine engine of FIG. 1.

FIG. 2 illustrates a view of an exemplary multi-staged axial compressor 11 that may be used in the gas turbine 10 of FIG. 1. As shown, the compressor 11 may include a plurality of stages. Each stage may include a row of compressor rotor blades 14 followed by a row of compressor stator blades 15. Thus, a stage may include a row of compressor rotor blades 14, which rotate about a central shaft, followed by a row of compressor stator blades 15, which remain stationary during operation.

Figure 3:
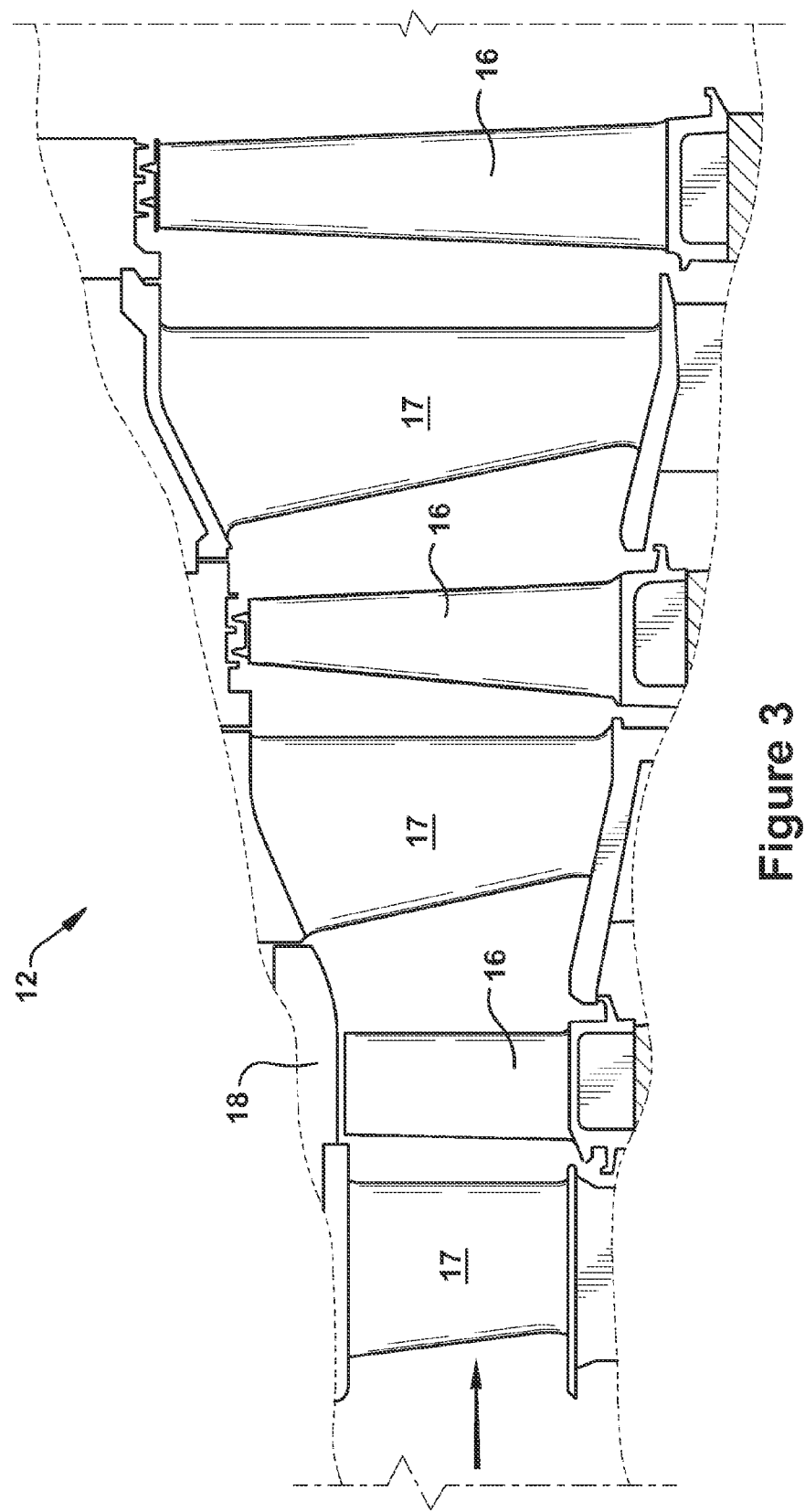
FIG. 3 is a sectional view of the turbine section of the combustion turbine engine of FIG. 1.

FIG. 3 illustrates a partial view of an exemplary turbine 12 that may be used in the gas turbine of FIG. 1. The turbine 12 may include a plurality of stages, each of which includes a plurality of rotor blades 16, which rotate about the shaft during operation, and a plurality of nozzles or stator blades 17, which remain stationary. The stator blades 17 generally are circumferentially spaced one from the other and fixed about the axis of rotation. The rotor blades 16 may be mounted on the rotor wheel for rotation about a shaft. It will be appreciated that the stator blades 17 and rotor blades 16 lie in the hot gas path of the turbine 12. The direction of flow of the hot gases through the hot gas path is indicated by the arrow. As one of ordinary skill in the art will appreciate, the turbine 12 may have more, or in some cases less, stages than the number that is illustrated in FIG. 3. Each additional stage may include a row of stator blades 17 followed by a row of rotor blades 16.

Note that, as used herein, reference, without further specificity, to "rotor blades" is a reference to the rotating blades of either the compressor 11 or the turbine 12, which may include both compressor rotor blades 14 and turbine rotor blades 16. Reference, without further specificity, to "stator blades" is a reference to the stationary blades of either the compressor 11 or the turbine 12, which may include both compressor stator blades 15 and turbine stator blades 17. Finally, the term "blade" may be used herein to generally refer to any of the types of blade. Thus, without further specificity, the term "blade" may be used to refer inclusively to all types of gas turbine blades, including compressor rotor blades 14, compressor stator blades 15, turbine rotor blades 16, and turbine stator blades 18. It should be further understood that the present application is not limited to assemblies relating only to compressor flowpaths, but that it also may find the same application in turbine flowpaths.

In one example of operation, the rotation of compressor rotor blades 14 within the axial compressor 11 may compress a flow of air. In the combustor 13, energy may be released when the compressed air is mixed with a fuel and ignited. The resulting flow of hot gases from the combustor 13, which may be referred to as the working fluid of the engine, is then directed over the rotor blades 16. The flow of working fluid may then induce the rotation of the rotor blades 16 about the shaft. In this manner, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced for the combustor, and also, for example, a generator to produce electricity.

Figure 4:
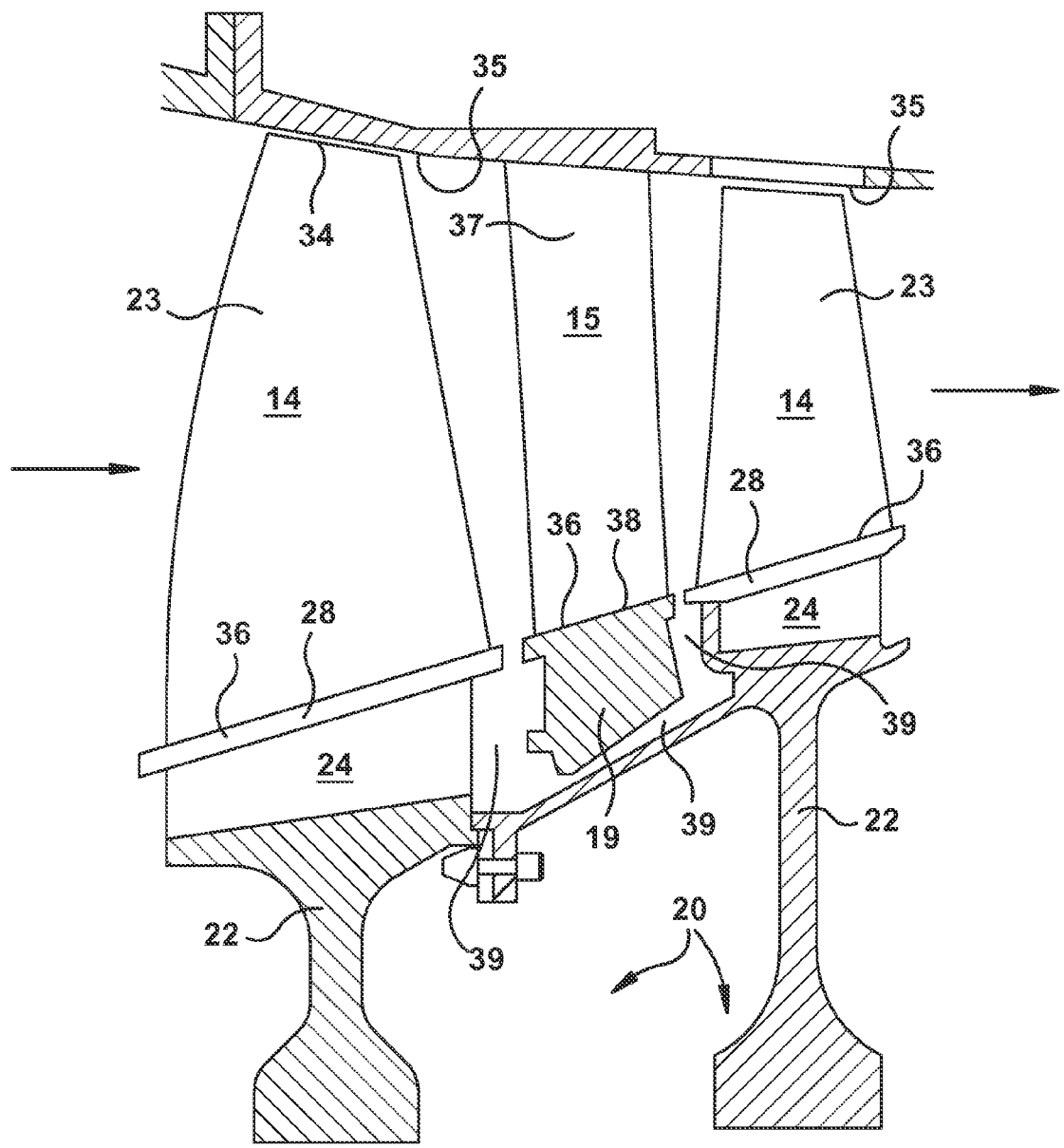
FIG. 4 is an exploded perspective view of an exemplary rotor wheel and blade assembly according a conventional design.
Figure 5:
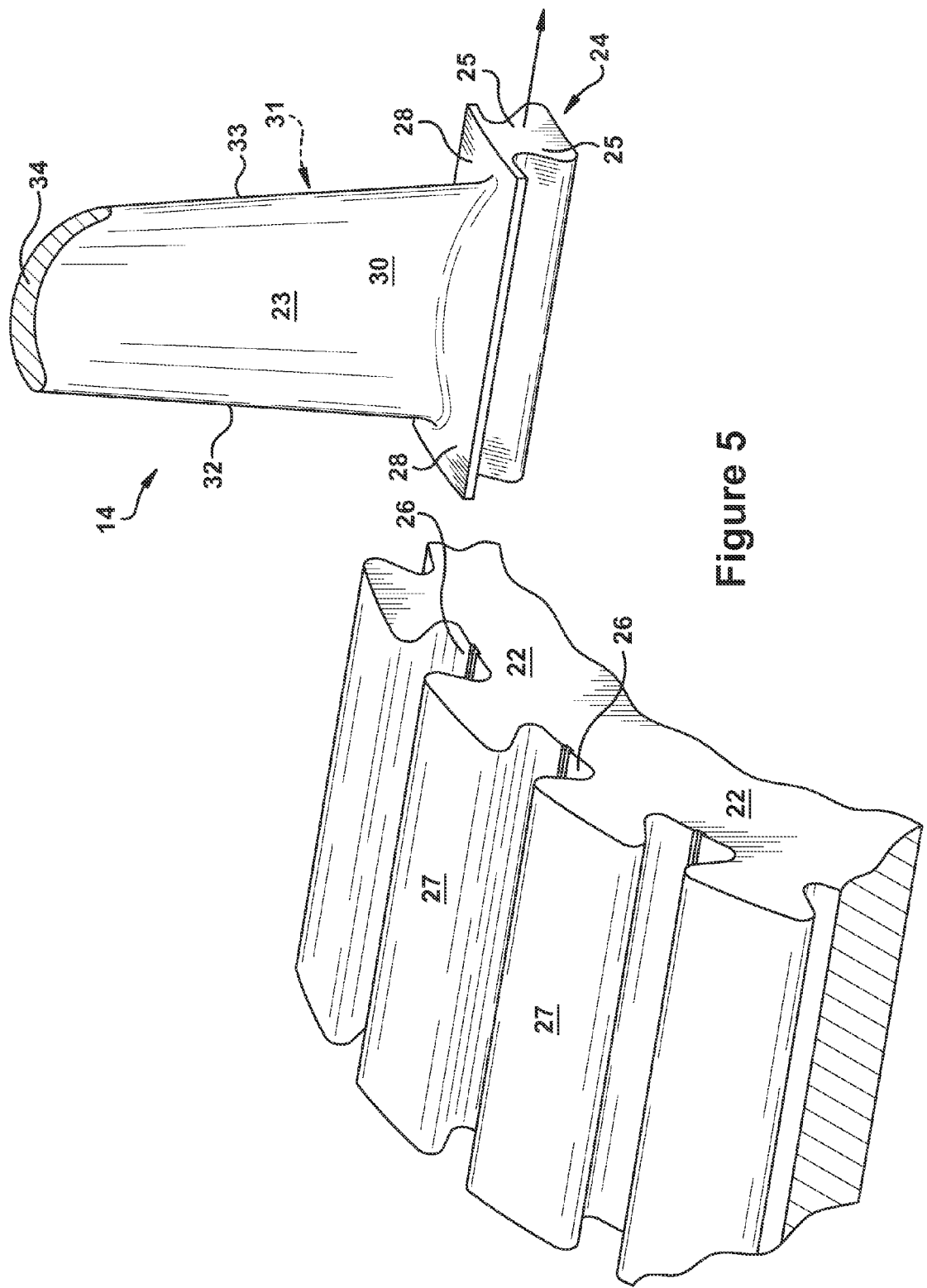
FIG. 5 is a cross-sectional view of a gas turbine flowpath having a stationary annulus filler according a conventional design.

By way of background, FIGS. 4 and 5 provide exemplary configurations of rotor and flowpath boundary assemblies according to conventional designs. As will be appreciated, FIG. 4 is an exploded perspective view of an exemplary rotor wheel and rotor blade assembly, while, FIG. 5 is a more detailed cross-sectional view of a flowpath that includes a stationary annulus filler 19 according to a conventional design. As shown, a rotor 20 of a compressor, for example, may include a plurality of rotor wheels 22. A plurality of rotor blades 14 may be disposed in an annular array about each rotor wheel 22. Each of the rotor blades 14 may include an airfoil 23, as well as a root portion (or "root") 24 by which the rotor blade 14 attaches to the rotor wheel 22. The root 24, as shown more clearly in FIG. 5, may include a connector or dovetail 25 that is formed on an innermost radial surface. The connector or dovetail 25 may be configured for mounting in or on a corresponding mating surface or dovetail slot 26. The dovetail slot 26, for example, may be axially oriented and formed through the perimeter or rim 27 of the rotor wheel 22 at regular, circumferential intervals. As discussed below in regard to another type of blade configuration (see FIG. 6), the root 24 also may include a shank 43 that extends between the connector or dovetail 25 and a platform 28. The platform 28 is disposed at the junction of the airfoil 23 and the root 24. It will be appreciated that the airfoil 23 is the active component of the rotor blade 14 that, in the case of the compressor, drives the flow of working fluid through flowpath via the rotation of the rotor wheel 22. The airfoil 23 of the rotor blade 14 may include a concave pressure side face 30 and a circumferentially or laterally opposite convex suction side face 31 that extend axially between opposite leading and trailing edges 32, 33, respectively, of the airfoil 23. The pressure side 30 and suction side faces 31 also extend in the radial direction from the platform 28 to an outboard tip 34. The outboard tip 34, as shown in FIG. 4, may be positioned near surrounding stationary structure that defines the outer boundary 35 of the flowpath through the compressor. As will be appreciated, the platform 28 may be configured to define an axial section of the inner boundary 36 of the flowpath.

Within the compressor 11 and turbine 12, a row of stator blades 15 may be positioned between a row of rotor blades 14 positioned to each side. Each of the stator blades 15 in the row may be configured to extend radially inward from a connection with the outer boundary 35 of the flowpath. The stator blades 15 may include an airfoil 37 for interacting with the flow of working fluid through the compressor 11, and, as illustrated, the stationary annulus filler 19 may be connected at an inboard tip 38 of the airfoil 37 so to be desirably positioned within an annulus cavity 39. As will be appreciated, the annulus cavity 39 refers to the inner radial gap that is formed between adjacent rows of rotor blades 14. More specifically, two neighboring rows of rotor blades 14 may define a circumferential extending annulus gap therebetween, which, as used herein, is the annulus cavity 39. As illustrated, the annulus cavity 39 may be described relative to the structure that surrounds it and the plane opening to the flowpath. Accordingly, along an upstream gap face the annulus cavity 39 may be defined by the root 24 of the rotor blade 14 in that direction, and, likewise, along a downstream gap face by the root 24 of the rotor blade 14 to that side of it. An inboard floor of the annulus cavity 39 may be defined by rotating cross structure that connects the rotor wheels 22 of the neighboring rows of rotor blades 14, as shown in FIG. 4. Other configurations are also possible, as the inboard floor may also be defined by the rim 27 of the rotor wheel 22, as discussed in more detail below. If not for the stationary annulus filler of FIG. 4, the annulus cavity 39 may be open to the flowpath by what may be referred to as an outboard ceiling. As used herein, the outboard ceiling may be defined relative to a reference plane that approximates a continuation of the surface contours of the surrounding platforms 28. That is, the reference plane may extend between and be approximately coplanar to the platforms 28 of the rotor blades 14 to each side of it. According to a conventional design, the stationary filler 19 may be positioned within the annulus cavity 39 and include a sidewall that, along with the platforms 28 to each side of the annulus filler, substantially forms the inner boundary 36 of the flowpath through that axial section of the compressor 11. According to a conventional design, the stationary annulus filler 19 may form a seal (not shown) with the rotating structure positioned about it so to prevent leakage across the blade stages.

Figure 6:
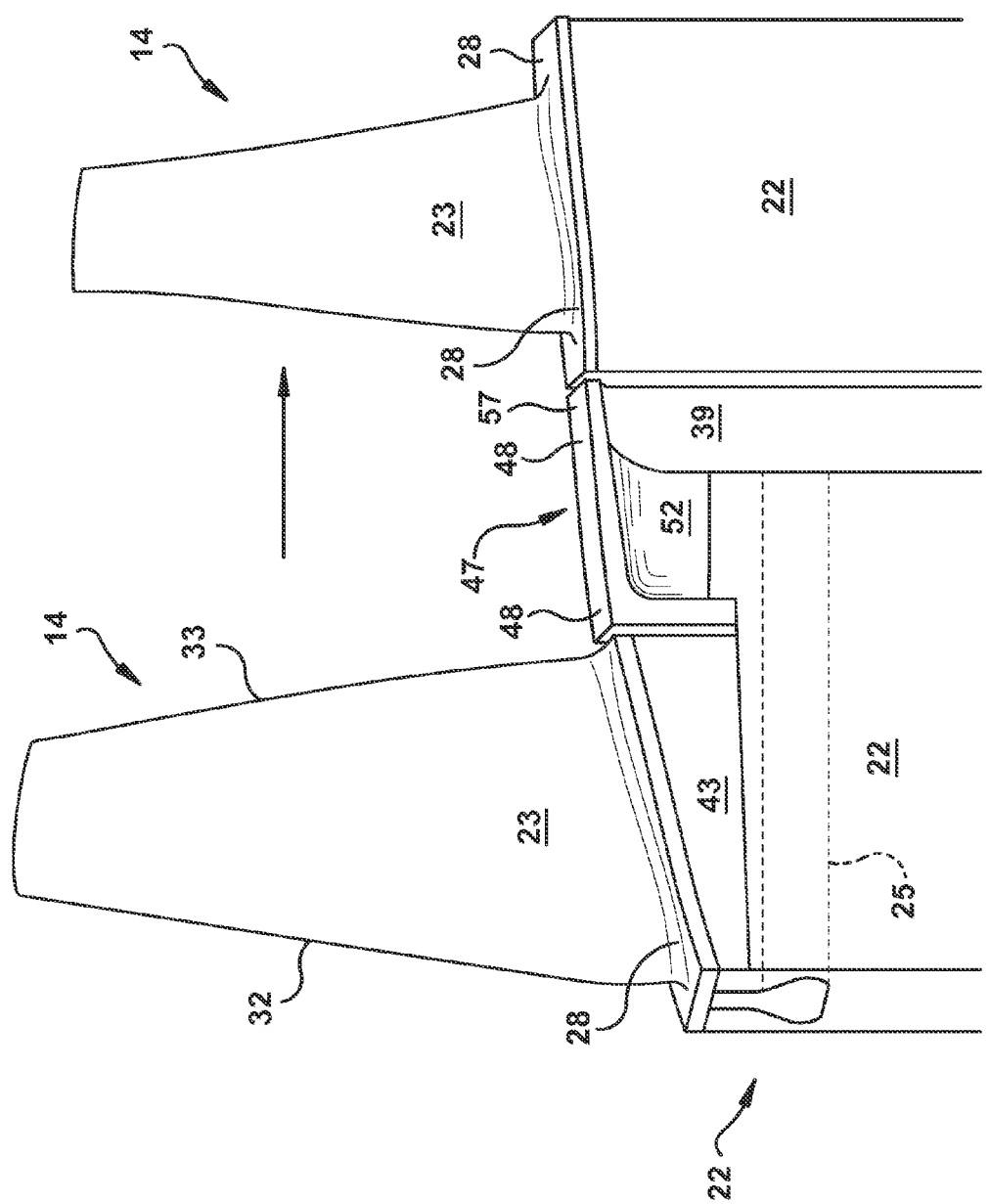
FIG. 6 is a perspective view of an annulus filler installed between neighboring rows of rotor blades according to an exemplary embodiment of the present invention.
Figure 10:
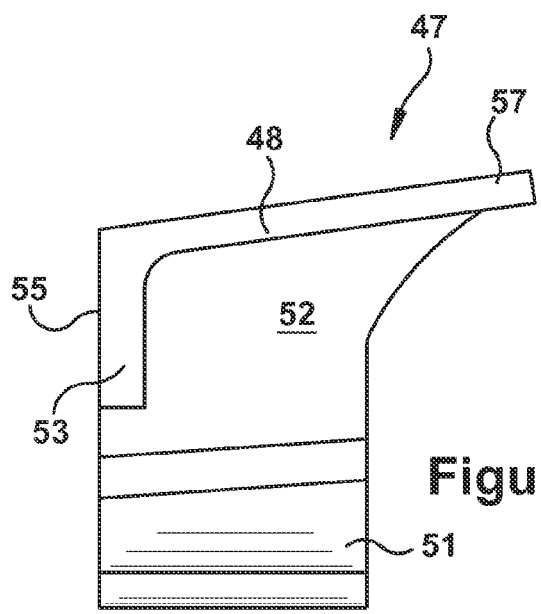
FIG. 10 is a side view of the annulus filler of FIG. 8.

FIGS. 6 and 7 are perspective views of a rotor blade 14 and rotating annulus filler 47 in an installed position in accordance with exemplary embodiments of the present invention. With reference also to FIGS. 8 through 10, which provide several closer views of the annulus filler 47 according to preferred embodiments, and FIGS. 10 and 11, which provide exemplary dovetail connectors that may be used for desirably positioning the rotor blade 14 and annulus filler 47, the annulus filler 47 may positioned between rows of rotor blades 14. As will be appreciated, the rotor blades 14 may be described as including an upstream row and a downstream row relative to the flow of working fluid through the flowpath. The upstream rotor blade 14 may include a platform 28 that defines an upstream axial section of the inner boundary 36 of the flowpath. Similarly, the downstream rotor blade 14 may include a platform 28 that defines a downstream axial section of the inner boundary 36 of the flowpath. The annulus filler 47, as shown, may be positioned between the upstream and downstream rotor blades 14, and may include an outboard planar and/or contoured surface 48 that defines at least part of an axial section of the inner boundary 36 of the flowpath that occurs between or bridges those parts of the flowpath defined by the platforms 28 of the upstream and downstream rotor blades 14.

The outboard surface 48 of the annulus filler 47 may be configured so to achieve an inner boundary transition between the inner boundary 36 defined by the first and the second axial sections of the flowpath. According to preferred embodiments, the inner boundary transition of the outboard surface 48 of the annulus filler 47 may include a smooth aerodynamic configuration transitioning between surface contours of the platforms 28 of the upstream and the downstream rotor blades 14. This aerodynamic transition may correspond to a radial transition between the trailing edge surface contour of the platform 28 of the upstream rotor blade 14 and the leading edge surface contour of the platform 28 of the downstream rotor blade 14. The annulus filler 47, as illustrated more clearly in FIGS. 8 through 10, may include a shank portion ("filler shank") 52 that extends between the outboard surface 48 and a mating surface, which may include a filler dovetail 51 that is configured to engage an axially engaged connector or dovetail slot 26 formed in a rotor wheel 22, as discussed in more detail with regard to FIGS. 11 and 12.

According to certain embodiments, the annulus filler 47 may be configured to include an overhanging arm 57. The overhanging arm 57, as illustrated, may include an axially cantilevered section that extends beyond the axial limits of the filler dovetail 51. Though other configurations are possible, the overhanging arm 57 may extend aftward toward the platform 28 of the downstream rotor blade 14. That is, the overhanging arm 57 may extend afterward a distance so to position a trailing edge of the annulus filler 47 desirably near a leading edge of the platform 28 of the downstream rotor blade 14. Configured in this manner, it will be appreciated that the outboard surface 48 of the annulus filler 47 may be described as including a cantilevered axial section and a non-cantilevered axial section. According to preferred embodiments, the ratio of the cantilevered axial section to non-cantilevered axial section may be between about 0.3 to 0.6.

Figure 11:
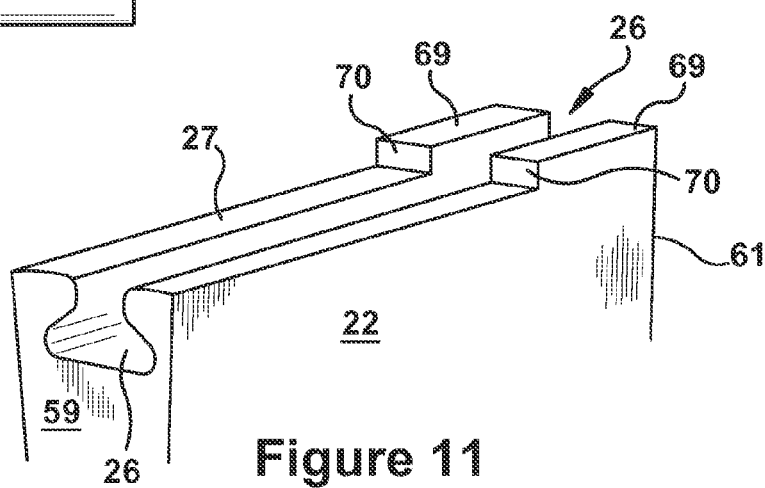
FIG. 11 is a perspective view of a rotor wheel that includes a dovetail slot according to an exemplary embodiment of the present invention.
Figure 12:
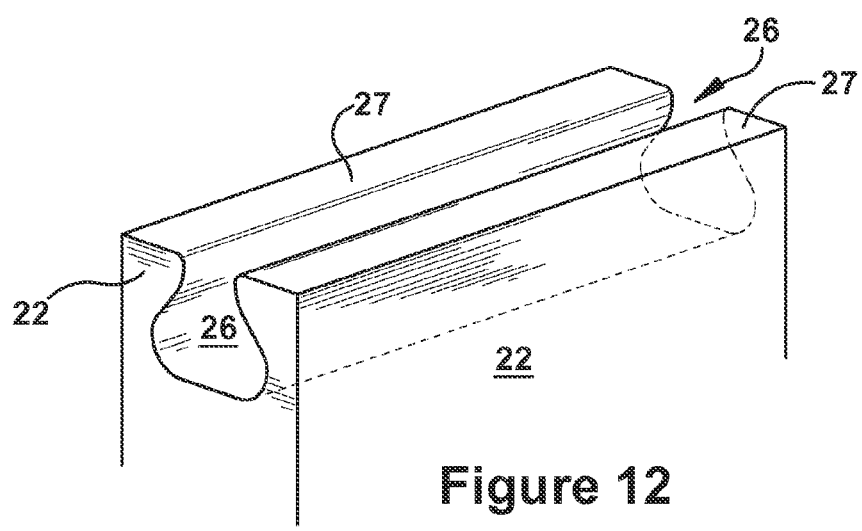
FIG. 12 is a perspective side cutaway view of a dovetail slot engaged by a blade dovetail and an annulus filler dovetail according to an exemplary embodiment of the present invention.

As shown most clearly in FIGS. 11 and 12, the present invention includes a rotor wheel 22 having an axial connector for connecting both the rotor blade 14 and the annulus filler 47 thereto. For example, the rotor wheel 22 may have a connector that is axially engaged that commonly supports and secures both the annulus filler 47 and the rotor blade 14 neighboring to the upstream side of the annulus filler 47. According to a preferred embodiment, this arrangement may be used within the flowpath of a compressor 11. According to another example, a rotor wheel 22 may include a connector that is axially engage and commonly supports and secures both the annulus filler 47 and the rotor blade 14 positioned just downstream of the annulus filler 47. According to a preferred embodiment, this arrangement may be used within the flowpath of a turbine 12. Thusly configured, it will be appreciated that the annulus filler 47 is a rotating component, and also that it is supported along a common connection axis as an adjacent rotor blade 14. While being adjacent components, however, according to preferred embodiments, the rotor blade 14 and the annulus filler 47 are configured as separate, non-integrally formed components relative to each other.

The axial connector that connects both the annulus filler 47 and the rotor blade 14 may be formed on the rim of the rotor wheel 22. The mating surface of the rotor blade 14 may formed on a radially innermost face of the rotor blade 14. Similarly, the mating surface of the annulus filler 47 may be formed on the radially innermost face of the annulus filler 47. According to a preferred embodiment, the connector includes an axially oriented dovetail slot 26. In such cases, the mating surface on the each of the rotor blade 14 and the annulus filler 47 may be configured as axially elongated dovetail 25 for slidably engaging the dovetail slot 26. As will be appreciated, the dovetail slot 26 may extend between a profiled dovetail opening formed on the forward axial face 59 and the aft axial face 61 of the rotor wheel 22. The dovetail slot 26 may be formed into the rim 27 of the rotor wheel 22. The dovetail 25 and the dovetail slot 26 may be configured to include multiple corresponding pressure faces 64 which prevent relative radial movement therebetween, thereby securing and supporting the rotor blade 14 and the annulus filler 47 during operation. More particularly, the cross-section of the dovetail 25 of the rotor blade 14 and the annulus filler 47 may be configured so to correspond to the profiled dovetail 25 opening formed on the axial faces 59, 61 of the rotor wheel 22. The dovetail 25 of the upstream rotor blade 14 and the annulus filler 47 may include a common axis upon installation. According to an alternative embodiments, the axially oriented connector between the rotor blade 14/annulus filler 47 and the rotor wheel 22 may be reversed such that an axially oriented dovetail is defined on the rotor wheel 22 and the axially oriented dovetail slots 26 are formed on the rotor blade 14/annulus filler 47. More specifically, a dovetail may be formed so to protrude radially from the rim 27 and extend axially between the axial faces 59, 61 of the rotor wheel 22. In such cases, as will be appreciated, the mating surfaces of both of the rotor blade 14 and annulus filler 47 may be configured as axially elongated dovetail slots configured for slidably engaging the dovetail formed on the rim 27 of the rotor wheel 22.

FIG. 12 is a perspective side cutaway view of a dovetail slot 26 engaged by a blade dovetail 25 and an annulus filler 47 dovetail 25 according to an exemplary embodiment of the present invention. As will be appreciated, the dovetail slot 26 may include an axial length that corresponds to the thickness of the rotor wheel 22. According to preferred embodiments, the dovetail 25 of the rotor blade 14 may have an axial length of at least over one half of the axial length of the dovetail slot 26. The dovetail 25 of the annulus filler 47 may include an axial length, which may approximately coincide with the difference between the axial length of the dovetail slot 26 of the rotor wheel 22 and the axial length of the dovetail 25 of the rotor blade 14. According to a preferred embodiment, the dovetail 25 of the rotor blade 14 may be configured to include an axial length that accounts for at least 70% of the axial length of the dovetail slot 26.

The distance between the upstream and downstream rotor blades 14, as already mentioned, may be referred to as the axial gap width of the annulus cavity 39 formed therebetween. An upstream gap face (which, for example, may be defined by the root 24 of the upstream rotor blade 14) and a downstream gap face (which, for example, may be defined by the root 24 of the downstream rotor blade 14) may form each axial side of the annulus cavity 39, and, thus, the axial gap width may be the distance between these components. An inboard floor of the annulus cavity 39 may be defined by the rim of the rotor wheel 22, and an outboard ceiling of the annulus cavity 39 may be defined by a reference plane extending between and approximately coplanar to the platforms 28 of the upstream and downstream rotor blades 14. According to certain preferred embodiments, the outboard surface 48 of the annulus filler 47 is configured approximately coplanar to the outboard ceiling of the annulus cavity 39. Alternatively, the annulus cavity 39 may be described as including an axial gap width that extends circumferentially about the flowpath, where the axial gap width is defined between a trailing edge of the platform 28 of the upstream rotor blade 14 and a leading edge of the platform 28 of the downstream rotor blade 14. In this case, the outboard surface 48 of the annulus filler 47 may be configured so to bridge substantially all of the axial gap width of the annulus cavity 39. The outboard surface 48 of the annulus filler 47 may include a leading edge that substantially abuts the trailing edge of the platform 28 of the upstream rotor blade 14. The outboard surface 48 of the annulus filler 47 may further include a trailing edge that resides in close, spaced relationship to the leading edge of the platform 28 of the downstream rotor blade 14. The close, spaced relationship may be based upon limiting ingestion of the working fluid therethrough during the operation of the gas turbine.

As further shown in FIGS. 7 through 11, features are disclosed that provide for efficient and robust axial retention of the annulus filler 47 and rotor blade 14 assembly, while, according to certain preferred embodiments, also providing resistance to leakage flow across blade rows. According to exemplary embodiments, an axial retainer according the present invention may include a radial protrusion, such as skirt 53, that protrudes radially so to radially overlap with a blocking surface or radial step 69 that projects from the rim 27 of the rotor wheel 22. As used herein, for example, the skirt 53 may radially overlap the blocking structure if the skirt 53 is configured so to include an inboard edge positioned radially inward of an outboard edge of the blocking structure. As illustrated, the skirt 53 may be configured at a leading edge of the annulus filler 47 so to include an axially oriented aft face or contact surface 54 that is opposite a forward face 55 of the annulus filler 47. The radial step 69 may be formed such that the radial overlap between it and the skirt 53 arrests axial movement of the annulus filler 47 once the annulus filler 47 is slid along the dovetail slot 26 so to attain a desired or installed position. The installed position may be a desired axial position such that the components of the annulus filler 47 achieve a desired spatial relationship with respect to surrounding structure, such as, for example, a position at which the trailing edge of the annulus filler 47 is offset a desired distance from the leading edge of the platform 28 of the downstream rotor blade 14.

According to a preferred embodiment, the radial step 69 may be project radially from the rim 27 of the rotor wheel 22 and be positioned toward the aft end of the dovetail slot 26. Though other configurations are also possible, as shown in the figures, the radial step 69 may be configured such that one end is adjacent to the aft axial face 61 of the rotor wheel 22. The radial step 69, as illustrated, may protrude from the rim 27 of the rotor wheel 22 and, thusly configured, may define an axially oriented face or contact surface 70 that is meant to interfere with the corresponding radially overlapping surface of the annulus filler 47, i.e., the aforementioned aft or contact face 54. According to preferred embodiments, as illustrated most clearly in FIG. 11, a pair of radial steps 69 may be circumferentially spaced about the dovetail slot 26. In this manner, the contact face 54 of the skirt 53 of the annulus filler 47 may contact the radial step 69 on each side of the dovetail slot 26. As will be appreciated, this generally spreads the contact area between the radial step 69 and the contact face 54 of the skirt 53 over a larger surface area and, thereby, may improve the robustness and durability of the interface. As should be understood, along with providing a robust connection, the retention feature discourages leakage across the blade row. Specifically, the skirt 53/step 69 assembly may block potential leakage passages once the interface is formed. Further, as will be appreciated, the connection may be configured to fill-in more of the inboard or under-platform region such that the high pressure fluids that typically infuse these areas during operation have leakage flowpaths that are more restricted.

Figure 13:
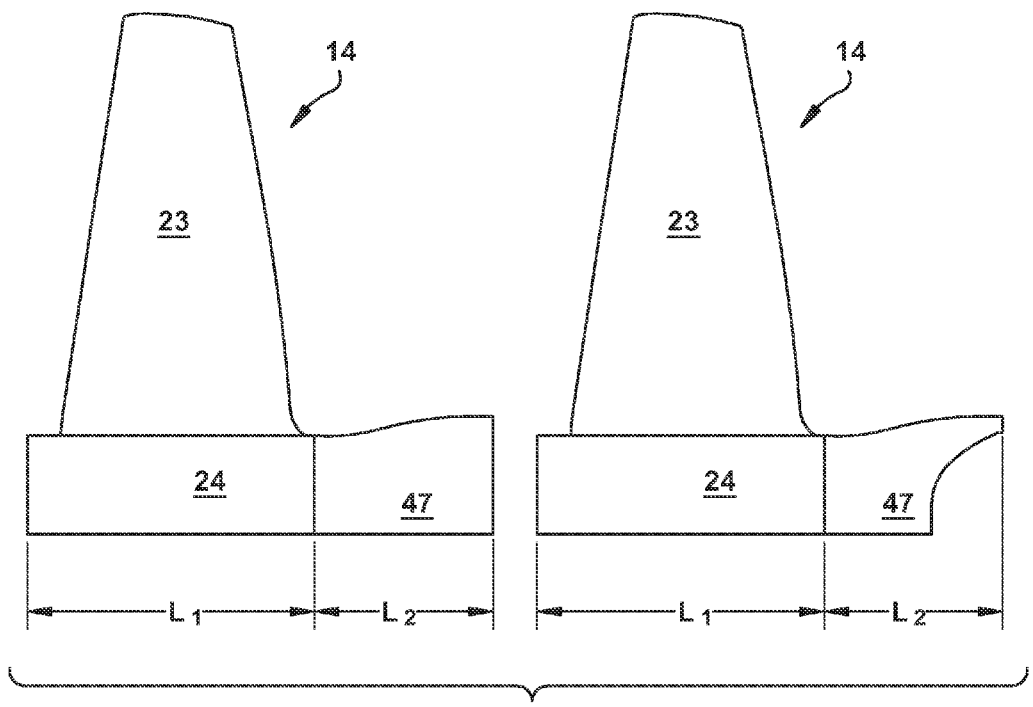
FIG. 13 is schematic side view comparing two rotor blade and annulus filler assemblies according to an exemplary embodiment of the present invention.

FIG. 13 is side schematic side view showing two rotor blade 14 and annulus filler 47 assemblies according to an exemplary embodiment of the present invention. As will be appreciated, the rotor blade 14 and annulus filler 47 assembly may be described by the relative axial lengths of each. For example, an axial length of the root of the rotor blade 14 may define a root length ("$L_1$" in FIG. 13) and an axial length of the outboard surface 48 of the annulus filler 47 may define a filler length ("$L_2$" in FIG. 13). While other configurations are possible, according to a preferred embodiment, the rotor blade 14 and the annulus filler 47 may be configured such that the ratio of the filler length to the root length is between about 0.3 to 0.7. More preferably, the ratio of the filler length to the root length may be about 0.5. According to another preferred embodiment, the rotor blade 14 and the annulus filler 47 may be configured such that the ratio of the filler length to the root length is between about 0.4 to 0.8. More preferably, the ratio of the filler length to the root length includes about 0.6.

Figure 14:
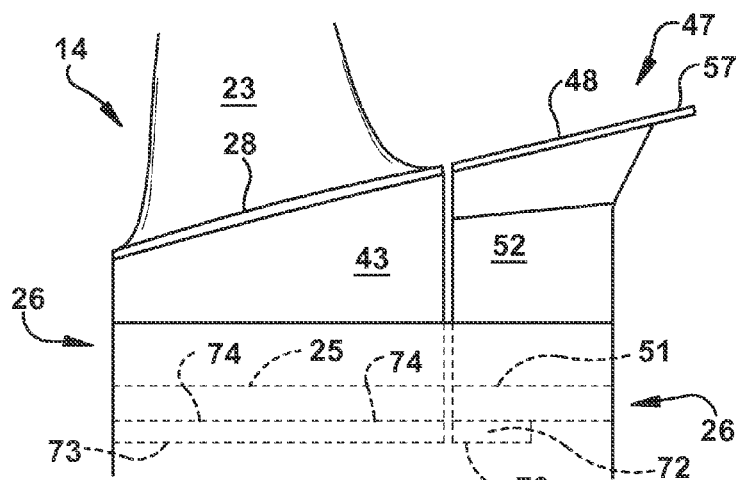
FIG. 14 is a side view of a rotor blade and annulus filler having an alternative axial retention feature according to an alternative embodiment of the present invention.
Figure 15:
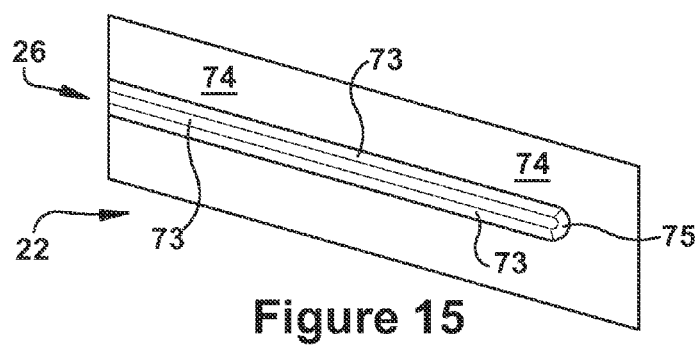
FIG. 15 is top view of the dovetail slot of FIG. 14.
Figure 16:
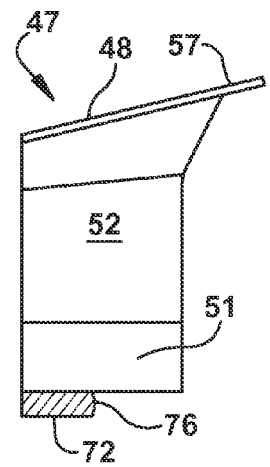
FIG. 16 is a side view of the annulus filler of FIG. 14.

FIG. 14 is a side view of a rotor blade 14 and annulus filler 47 having an alternative axial retention feature according to an alternative embodiment of the present invention. With reference also to FIGS. 15 and 16, respectively, a top view of the dovetail slot 26 and a side view of the annulus filler 47 of FIG. 14 is also provided. As illustrated, according to exemplary embodiments, the annulus filler 47 may include an elongated radial protruding nub or rib 72 that coincides in cross-section shape with an axially extending mating groove 73 formed in the floor 74 of the dovetail slot 26. As illustrated, in a preferred embodiment, the mating groove 73 has a substantially constant cross-section shape that elongates from the forward axial face 59 of the rotor wheel 22 and terminates at a terminating face 75 that is positioned within the aftward portion of the rotor wheel 22. According to a preferred embodiment, the terminating face 75 of the groove 73 resides near the aft axial face 61 of the rotor wheel 22. As will be appreciated, the rib 72 on the annulus filler 47 may be configured to include a contact face 76 formed so to radially overlap and make contact with the terminating face 75 of the groove 73. Accordingly, the terminating face 75 and the contact face 76 may cooperate so to arrest continued aftward axial movement of the annulus filler 47 once the annulus filler 47 is slid along the dovetail slot 26 so to attain a desired or installed position. According to a preferred embodiment, the rib 72 projects radially inward from an innermost surface of the dovetail 25 of the annulus filler 47. As illustrated, the rib 72 may be positioned toward the forward end of the dovetail 25. Though other configurations are also possible, as shown, the rib 72 may be configured such that a forward end resides adjacent to the forward face of the dovetail 25 of the annulus filler 47. The aft end or contact face 76 of the rib 72 may be configured to reside near the axial midpoint of the dovetail 25 of the annulus filler 47.

Additionally, the combined rotor blade/annulus filler assembly of FIGS. 14 through 16 may be retained against axially forward movement by an additional conventional locking mechanism. In this manner, the assembly may be made secure against forward or rearward axial movement. Further, according to an alternative embodiment, such as when the annulus filler 47 is positioned at upstream of the rotor blade 14 instead of the downstream side as provided in the figures, the configuration of the rotor blade/annulus filler assembly may be reversed such that the annulus filler 47 is slidably engaged from an aftward direction and the rib 72/groove 73 assembly, once engaged, would restrict further axial movement in the forward axial direction. As will be appreciated, in this case, the other conventional locking mechanism would be configured to prevent rearward axial movement of the combined assembly.

Figure 17:
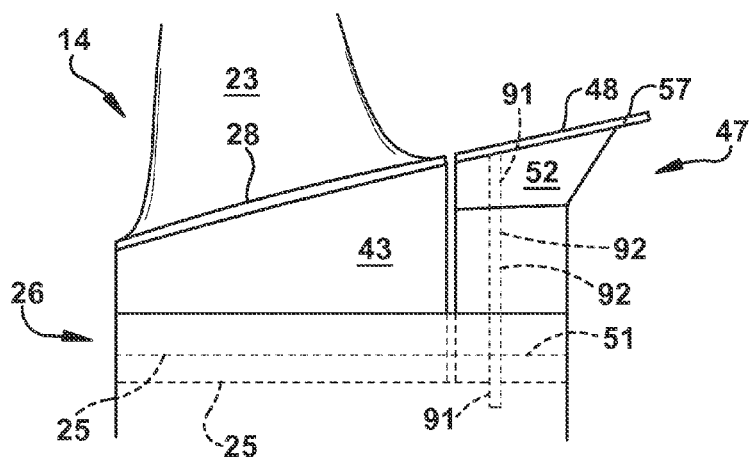
FIG. 17 is a side view of a rotor blade and annulus filler having an alternative retention feature according to an alternative embodiment of the present invention.

FIG. 17 is a side view of a rotor blade 14 and annulus filler 47 having an alternative axial retention feature according to exemplary embodiments of the present invention. As illustrated, an aperture 91 and pin 92 configuration of the annulus filler 47 may be used as a way to restrict axial movement of the rotor blade 14 in both the forward and aftward axial directions. As shown, an aperture 91 may be made to extend radially through the annulus filler 47 sharing shares the same axially engaged dovetail slot 26 as a rotor blade 14. The aperture 91 may further extend into the rim 27 of the rotor wheel 22. Once engage, as will be appreciated, the pin 92 mechanically interfaces with the rotor wheel 22 in such a way as to retain the blade 14/annulus filler 47 against axial movement in either the forward or aftward directions.

FIG. 18 is a side view of a rotor blade 14 and annulus filler 47 having an alternative attachment configuration according to an exemplary embodiment. With reference also to FIGS. 19 and 20, respectively, a side view and perspective view of the configuration of FIG. 18 are provided that present additional aspects according to other embodiments. As with the other embodiments already discussed, the annulus filler 47 may positioned between neighboring rows of rotor blades 14. Also, the rim 27 of the rotor wheel 22 may include an axial connector for engaging the mating surface formed on the radially innermost face of the rotor blade 14. In this case, however, the annulus filler 47 may connect to the rotor wheel 22 via a connector that is not oriented in the same manner as the connector of the rotor blade 14. Pursuant to these embodiments, as illustrated, the rim 27 of the rotor wheel 22 may include a circumferential connector for circumferentially engaging a mating surface formed on the radially innermost face of the annulus filler 47. More specifically, the axial connector of the rotor blade 14 may include, as previous described, an axially oriented dovetail slot 26 and the corresponding mating surface on the rotor blade 14 be an axially elongated dovetail 25 configured for slidably engaging the dovetail slot 26. In the case of the annulus filler 47, however, a circumferential connector may be formed that includes a circumferential dovetail 81 formed about the rim 27 of the rotor wheel 22, as illustrated, and the mating surface of the annulus filler 47 may be configured as a circumferentially oriented dovetail slot 82 that corresponds to the dovetail 81. The dovetail slot 82 may be configured for slidably engaging the wheel dovetail 81. According to another example, the rotor wheel 22 may be configured so to include a circumferential dovetail slot, and the annulus filler 47 may be configured so to include the dovetail.

Additionally, according to a preferred embodiment, as illustrated most clearly in FIG. 20, an overhanging arm 57 may be formed on the leading edge of the outboard surface 48. The overhanging arm 57 may include an axially cantilevered section that extends beyond the axial limits of the dovetail slot 82. According to a preferred embodiment, the overhanging arm 57 also may be described as extending beyond the axial limits of the shank 52 of the annulus filler 47, as illustrated. Though other configurations are possible, the overhanging arm 57 may extend forward toward the platform 28 of an upstream rotor blade 14. That is, the overhanging arm 57 may extend forward a distance so to position a leading edge of the annulus filler 47 desirably near a trailing edge of the platform 28 of the upstream rotor blade 14. As also shown in FIGS. 19 and 20, an aft skirt 77 may be positioned at the aft edge of the outboard surface 48. As illustrated, the aft skirt 77 may extend radially inward along the trailing edge of the annulus filler 47 and, thus, may define an aft-facing skirt face 78.

According to the present invention, the dovetail attachment geometry between the annulus filler 47 and the rotor wheel 22 may include several features that improve the performance of the connection. First, more than one pressure face 64 may be included, which, for example, may be accomplished via a multi-tang "tree" configuration. Additionally, the pressure faces 64 may be angled so to prevent concentrating stresses within the adjoining components. Thus, the angle of the pressure face 64 may be varied between 0° and 90° relative to the engine rotational centerline. For example, according to a preferred embodiment, as illustrated in FIGS. 18 and 19, the pressure faces 64 may be angled at approximately 45°. According to another preferred embodiment, as illustrated in FIG. 20, the pressure faces may be approximately 0° relative to the engine rotational centerline. As also illustrated in FIG. 20, other features for spreading stresses may be incorporated within the geometry of the dovetail connector. As will be appreciated, the reduction of stress concentrations may maximize the life span of the rotor wheel 22 and annulus filler 44 without negatively impacting performance. According to one embodiment, thus, the dovetail 81 formed on the rotor wheel 22 may include a beveled corner 85, as shown in FIG. 20. According to another embodiment, a backcut 86 may be formed at a corner of the filler dovetail slot 86 so to spread over a larger area the stresses that would otherwise concentrate at that location. The material may be removed using any suitable process such as a grinding or milling process or the like. As will be appreciated, these features also may be used with the other embodiments disclosed herein.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each possible iteration is not herein discussed in detail, though all combinations and possible embodiments embraced by the several claims below are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:
1. A gas turbine that includes a flowpath having a rotor assembly, the rotor assembly comprising:
   a first rotor wheel supporting a first rotor blade, the first rotor blade comprising a platform that defines a first axial section of an inner boundary of the flowpath;
   a second rotor wheel supporting a second rotor blade, the second rotor blade comprising a platform that defines a second axial section of the inner boundary of the flowpath; and
   an annulus filler that includes an outboard surface that defines at least part of a third axial section of the inner boundary of the flowpath occurring between the first axial section and the second axial section of the inner boundary of the flowpath;
   wherein the first rotor wheel comprises a connector for axially engaging a mating surface formed on a radially innermost face of the first rotor blade and a mating surface formed on a radially innermost face of the annulus filler.

2. The gas turbine according to claim 1, wherein, relative an expected direction of flow of a working fluid through the flowpath during operation of the gas turbine, the first axial section comprises an upstream axial section and the second axial section comprises a downstream axial section of the inner boundary of the flowpath, and the third axial section comprises a middle axial section of the inner boundary of the flowpath disposed therebetween.

3. The gas turbine according to claim 2, wherein the gas turbine comprises a compressor operably linked to a turbine; and
   wherein the flowpath comprises a compressor flowpath.

4. The gas turbine according to claim 3, wherein the annulus filler comprises a rotating component; and
   wherein the first rotor blade and the annulus filler comprise separate, non-integrally formed components relative to each other.

5. The gas turbine according to claim 3, wherein the annulus filler comprises a rotating component; and
   wherein the annulus filler comprises an integrally formed single component.

6. The gas turbine according to claim 1, wherein, relative an expected flow direction of a working fluid through the flowpath during operation of the gas turbine, the first axial section comprises a downstream axial section and the second axial section comprises an upstream axial section of the inner boundary of the flowpath, and the third axial section comprises a middle axial section of the inner boundary of the flowpath disposed therebetween.

7. The gas turbine according to claim 6, wherein the gas turbine comprises a compressor operably linked to a turbine; and
   wherein the flowpath comprises a turbine flowpath.

8. The gas turbine according to claim 3, wherein the third axial section of the inner boundary spans between the inner boundary of the first axial section and the second axial section of the flowpath; and
   wherein the outboard surface of the annulus filler comprises an inner boundary transition between the first and the second axial sections of the flowpath.

9. The gas turbine according to claim 8, wherein the third axial section of the inner boundary of flowpath is defined between a trailing edge of the platform of the first rotor blade and a leading edge of the platform of the second rotor blade;
   wherein the outboard surface of the annulus filler is configured so to bridge substantially all of the third axial section; and wherein the inner boundary transition of the outboard surface of the annulus filler comprises a smooth aerodynamic configuration radially transitioning between surface contours of the platforms of the first and the second rotor blades.

10. The gas turbine according to claim 9, wherein the outboard surface of the annulus filler comprises a leading edge and a trailing edge;
wherein the leading edge of the outboard surface of the annulus filler substantially abuts the trailing edge of the platform of the first rotor blade; and
wherein the trailing edge of the outboard surface of the annulus filler is positioned so to reside in close, spaced relationship to the leading edge of the platform of the second rotor blade.

11. The gas turbine according to claim 3, wherein the dovetail slot comprises an axial length corresponding to a thickness of the first rotor wheel;
wherein the dovetail of the rotor blade comprises an axial length of at least over one half of the axial length of the dovetail slot; and
wherein the dovetail of the annulus filler comprises an axial length of substantially the difference between the axial length of the dovetail slot and the axial length of the dovetail of the rotor blade.

12. The gas turbine according to claim 11, wherein the dovetail of the rotor blade comprises over 50% of the axial length of the dovetail slot.

13. The gas turbine according to claim 1, wherein the annulus filler comprises an overhanging arm axially cantilevered aftward relative to an axial position of an aft end of the dovetail of the annulus filler.

14. The gas turbine according to claim 13, wherein the overhanging arm extends afterward a distance so to position a trailing edge of the annulus filler desirably near a leading edge of the platform of the second rotor blade.

15. The gas turbine according to claim 14, wherein the outboard surface of the annulus filler comprises a cantilevered axial section and a non-cantilevered axial section; and
wherein the ratio of the cantilevered axial section to non-cantilevered axial section is between about 0.3 to 0.6.

16. The gas turbine according to claim 3, wherein the connector comprises an axially engaged dovetail slot; and
wherein the mating surface on the each of the first rotor blade and the annulus filler comprises an axially engaged dovetail configured for slidably engaging the dovetail slot.

17. The gas turbine according to claim 16, wherein the dovetail and dovetail slot comprise multiple corresponding pressure faces for preventing relative radial movement therebetween; and
wherein the dovetails of the first rotor blade and the annulus filler comprise a common axis upon installation;
wherein the dovetail and dovetail slot comprise one of: a parallel configuration relative to a central axis of the gas turbine; and a tangentially canted configuration relative to the central axial of the gas turbine.

18. The gas turbine according to claim 16, wherein the dovetail slot extends between a profiled dovetail opening formed on each axial face of the rotor wheel and into a rim of the first rotor wheel; and
wherein a cross-section of the dovetail of each of the first rotor blade and the annulus filler corresponds to the profiled dovetail opening formed on the axial faces of the rotor wheel.

19. The gas turbine according to claim 3, wherein the connector comprises an axially engaged dovetail that protrudes from a rim of the rotor wheel and elongates between each axial face of the rotor wheel; and
wherein the mating surfaces of each of the first rotor blade and the annulus filler comprises an axially engaged dovetail slot configured for slidably engaging the dovetail protruding from the rotor wheel.

20. The gas turbine according to claim 3, further comprising a stator blade attached to stationary structure defining an outer boundary of the flowpath, the stator blade including an airfoil extending inboard to an inboard tip;
wherein the inboard tip of the airfoil comprises a position just short of and in spaced relation to a region of the outboard surface of the annulus filler.

21. The gas turbine according to claim 3, wherein the axial length of the outboard surface of the annulus filler comprises a filler length;
wherein an axial length of the root of the first rotor blade comprises a root length; and
wherein a ratio of the filler length to the root length comprises between about 0.3 to 0.7.

22. The gas turbine according to claim 3, wherein the axial length of the outboard surface of the annulus filler comprises a filler length;
wherein an axial length of the root of the first rotor blade comprises a root length; and
wherein a ratio of the filler length to the root length comprises between about 0.3 to 0.7.

23. The gas turbine according to claim 3, wherein the first rotor blade and the second rotor blade define a circumferential extending annulus gap therebetween; and
wherein the annulus gap is defined:
along an upstream gap face by a root of the first rotor blade;
along a downstream gap face by a root of the second rotor blade;
along an inboard floor by a rim of the first rotor wheel; and
along an outboard ceiling by a reference plane extending between and approximately coplanar to the platforms of the first rotor blade and the second rotor blade.

24. The gas turbine according to claim 23, wherein the outboard surface of the annulus filler is configured approximately coplanar to the outboard ceiling of the annulus gap.

25. The gas turbine according to claim 23, wherein the annulus gap comprises an axial gap width that extends circumferentially about the flowpath, the axial gap width defined between a trailing edge of the platform of the first rotor blade and a leading edge of the platform of the second rotor blade; and
wherein the outboard surface of the annulus filler is configured so to bridge substantially all of the axial gap width of the annulus gap.

26. The gas turbine according to claim 25, wherein the outboard surface of the annulus filler comprises a leading edge that substantially abuts the trailing edge of the platform of the first rotor blade; and
wherein the outboard surface of the annulus filler comprises a trailing edge that resides in close, spaced relationship to the leading edge of the platform of the second rotor blade, the close, spaced relationship comprising one based upon limiting ingestion of the working fluid therethrough during the operation of the gas turbine.

27. The gas turbine according to claim 23, wherein the inner boundary transition of the outboard surface of the annulus filler comprises a smooth aerodynamic transition between the platforms of the first and the second rotor blades given a first surface contour of the platform of the first rotor blade and a second surface contour of the platform of the second rotor blade.

28. The gas turbine according to claim 27, wherein the first surface contour comprises a surface contour adjacent to a trailing edge of the platform of the first rotor blade and the second surface contour comprises a surface contour adjacent to a leading edge of the platform of the second rotor blade.

* * * * *